April 6, 1965 J. L. METZ 3,176,580
SOUND TAPE AND PICTURE SLIDE HOLDER
Filed Feb. 8, 1962 4 Sheets-Sheet 1
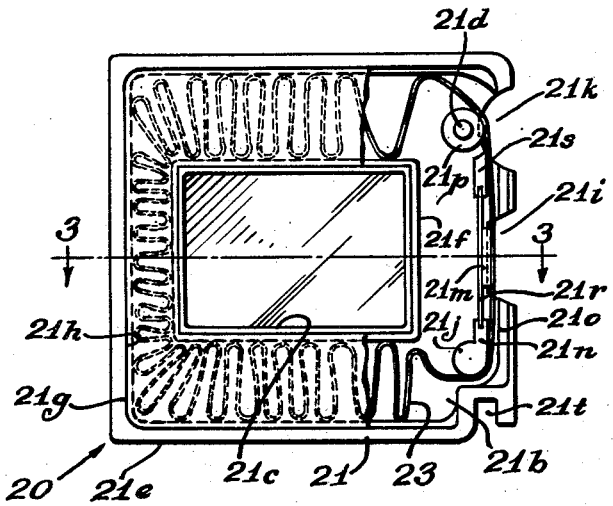
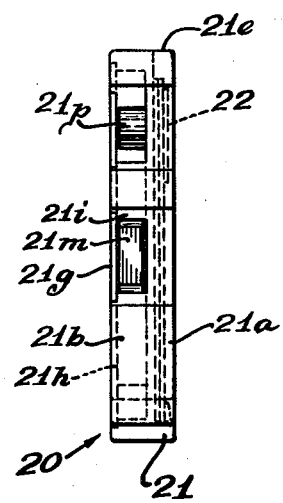
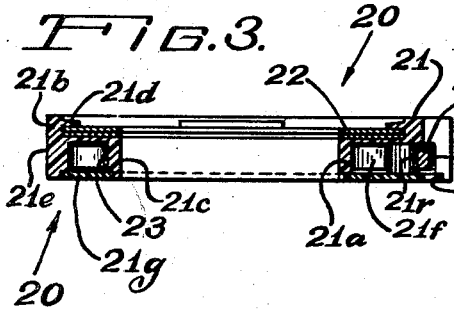
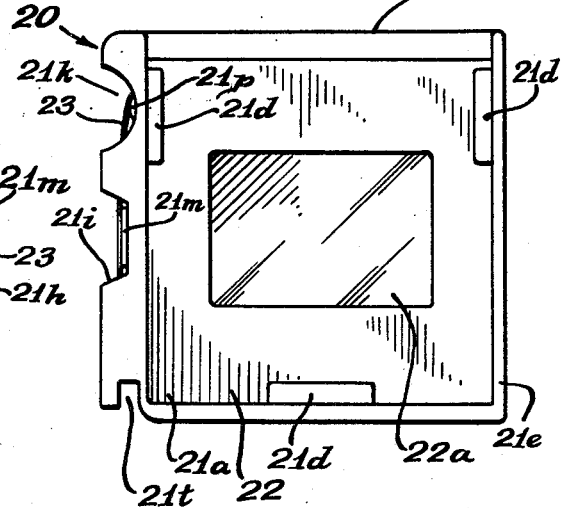
Inventor:
Jack L. Metz
By J.R. Hall
Atty.

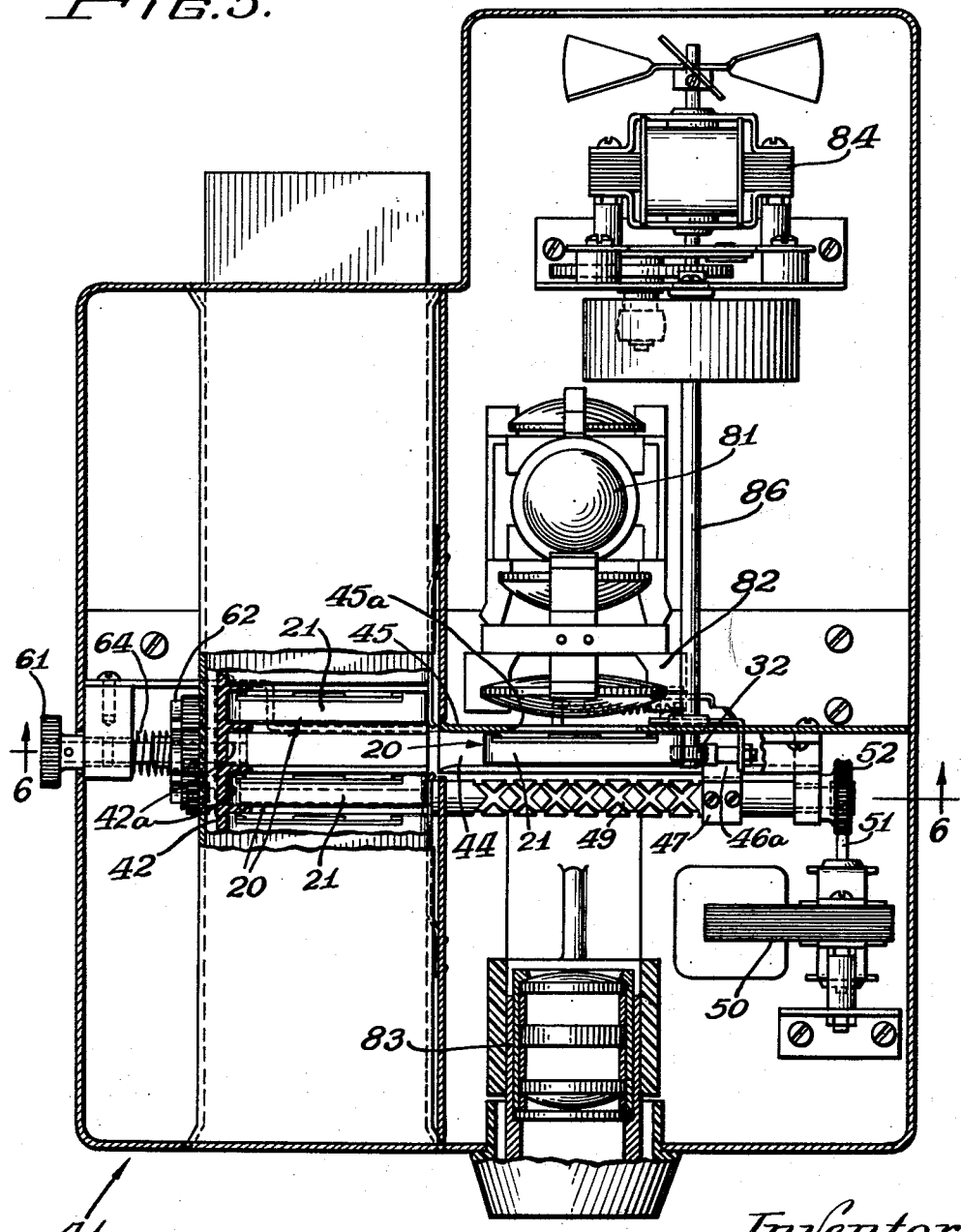

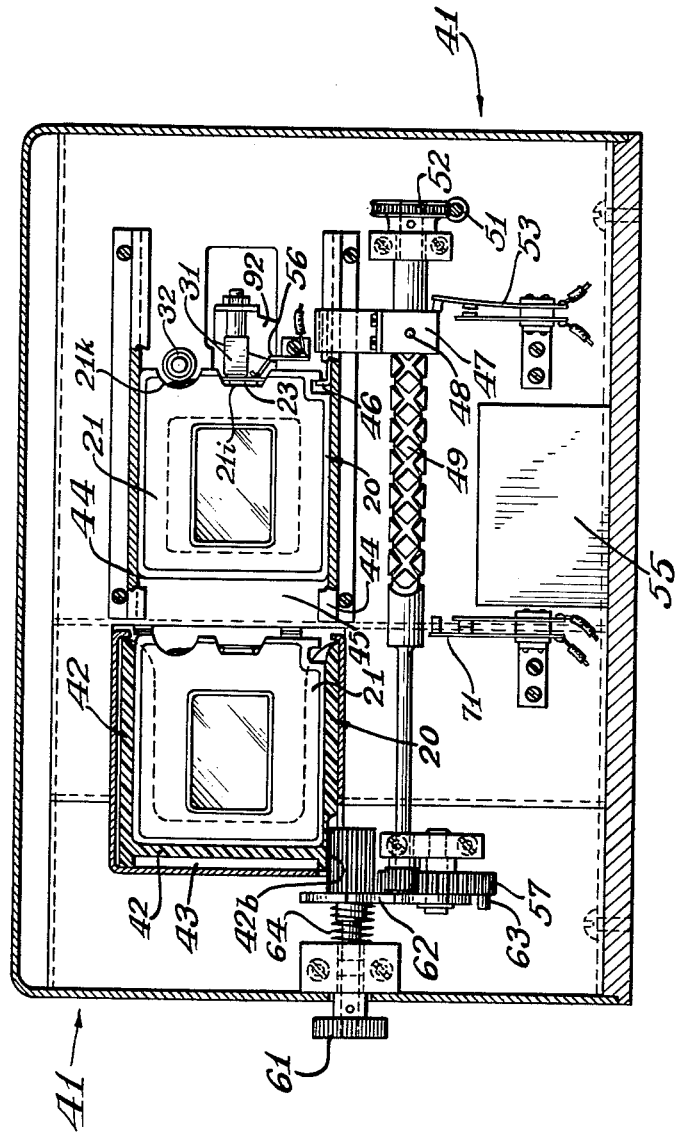

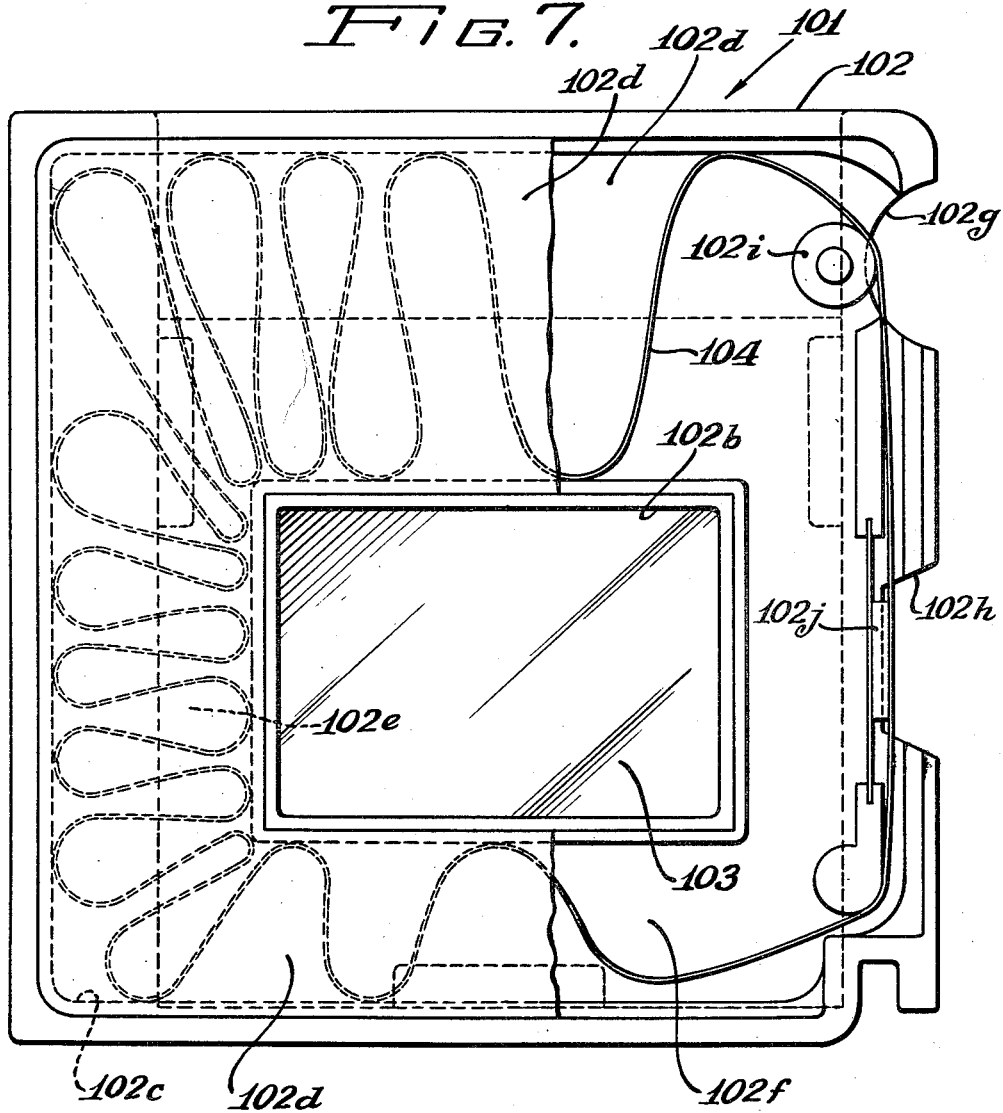

United States Patent Office 3,176,580
Patented Apr. 6, 1965

3,176,580
SOUND TAPE AND PICTURE SLIDE HOLDER
Jack L. Metz, Des Plaines, Ill., assignor to Bell & Howell Company, Chicago, Ill., a corporation of Illinois
Filed Feb. 8, 1962, Ser. No. 172,014
5 Claims. (Cl. 88—28)

This invention relates to slide projection, and more particularly to sound slides having magnetic tapes.

An object of the invention is to provide a slide holder having a portion holding a photographic transparency and a peripheral tape storage portion holding a sound tape.

Another object of the invention is to provide a slide holder having a portion for holding a photographic slide together with a peripheral storage chamber surrounding the transparency of the slide and in which an endless magnetic tape is mounted.

A further object of the invention is to provide a slide holder having a peripheral storage chamber and means for holding a photographic slide in a position in which the transparency is aligned with the opening through the peripheral chamber.

A complete understanding of the invention may be obtained from the following detailed description of slide projection apparatus forming specific embodiments thereof, when read in conjunction with the appended drawings, in which:

FIG. 1 is a front elevational view of a sound slide holder forming one embodiment of the invention;

FIG. 2 is an end view of the holder of FIG. 1;

FIG. 3 is a horizontal sectional view taken along line 3—3 of FIG. 1;

FIG. 4 is a rear elevational view of the holder of FIG. 1;

FIG. 5 is an enlarged horizontal sectional view of a sound slide projector adapted to project and play the sound slide of FIG. 1;

FIG. 6 is a vertical sectional view taken along line 6—6 of FIG. 5; and

FIG. 7 is a front elevational view of a sound slide holder forming an alternate embodiment of the invention.

The invention provides sound slide projection apparatus including a sound slide holder having a peripheral tape storage chamber for holding a sound tape and a portion for holding a mounted slide with its transparency in alignment with the central opening of the peripheral tape storage chamber. The holder may be moved to an operative position in a slide projector, in which position the transparency of the mounted slide is aligned with the aperture of the slide projector and the sound tape is in engagement with a sound head and means for advancing the sound tape of the projector. The sound tape is endless and enclosed within the storage chamber in the slide holder except for the portion engaging the feeding means and the sound head. It is also desirable to have a plurality of the sound slide holders with a tray for carrying the slide holders with the projector provided with means for automatically moving each slide holder from the tray to its operative position and back into the tray.

Referring now in detail to the drawings, there is shown in FIGS. 1–4 a sound slide 20 including a holder 21 having a peripheral audio tape holding portion 21a and a visual slide holding portion 21b concentric with the audio portion. The slide also includes a mounted transparency or slide 22 and a sound tape 23. The audio portion 21a has an aperture 21c larger than transparency 22a, and the visual portion 21b has retaining tabs 21d projecting from frame portion 21e of the holder. Certain features of the slide holder 21 are disclosed and claimed in co-pending application Serial No. 786,199, now Patent No. 3,044,198, issued July 17, 1962, filed January 12, 1959 by Frank C. Badalich and assigned to the common assignee.

The audio portion 21a of the holder 21 has an annular cup-shaped recess or chamber 21f for holding the sound tape 23, which, in the embodiment shown, is a magnetic tape and is endless, the tape being of a width slightly less than the portion of depth of the chamber from the bottom of the chamber to an annular cover plate 21g which fits into recess 21h and is retained by cement or detenting. The tape, of course, may be of the optical type. The holder has an edge notch or recess 21i for receiving a known magnetic sound head 31 (FIG. 6) and an edge notch or recess 21k for receiving capstan 32. The tape travels around guide roller 21j, over pressure pad 21m, between guide member 21n molded integrally with the body portion of the holder and wall 21o and around backing roller 21p rotatable on pin 21q. The pad 21m is mounted on leaf spring 21r seated in slots in members 21n and 21s. The pad 21m may be formed of polytetrafluoroethylene or may be of felt. If desired, the roller 21p, instead of being rotatable as shown, may be fixed against rotation. A recess or notch 21t is provided for pushing and pulling the slide holder.

A projector 41 (FIGS. 5 and 6) is designed to index a tray 42, which carries the slide 20, along a guideway 23 sequentially to a slide changing position in which a selected one of the slides 20 is aligned with a changer guideway 24. The tray has septums 42a for receiving and holding the slides 20. The guideway 44 extends past a projection aperture 45a in a wall 45 to the capstan or pinch roller 32 and sound head 31, and a hook 46 slidable in the bottom channel of the guideway 44 is adapted to pull the aligned slide out of the tray to the projection and playing position, in which position opening 21c is aligned with the projection aperture 45a and the sound head and the capstan operatively engage the tape, and return the slide into the tray. The hook 46 has a bracket portion 46a fixed rigidly to a nut 47 having a thread pin 48 meshing with a double-threaded reversible feed screw or endless worm 49 driven by electric motor 50 through worm 51 and worm gear 52. Whenever one of the slides 20 is brought to the projection and playing position, the nut 47 opens limit switch 53 to stop the motor.

When the slide 20 is in its projection and playing position, the tape 23 is pressed or pinched between the capstan 32 (FIG. 6) and backing roller 21p and the capstan pulls the tape past the known sound head 31, which reads the tape and transmits the signals to a known amplifier and loud speaker system 55 to play the sound recorded on the sound tape 23, the spring urged pad 21m holding the tape against the sound head. A leaf spring contactor 56 contacts the tape and serves when a conductive tab (not shown) positioned in a predetermined location at the end of the recording thereon on the tape budges the contactor 56 and the shell of the head 31 to close a circuit to the motor, this circuit being in parallel with the switch 53. This starts the motor 53 to drive the nut 47 back to the left, as viewed in FIG. 6, to return the slide to the tray. The screw 49 turns a gear 57 to drive a Geneva gear mechanism through gear 59 to index the tray 42 to present the next slide at the time the took 46 is laterally aligned with the notches 21t in the slides in the tray, the Geneva gear mechanism serving to drive indexing gear 60 (FIG. 1) meshing with rack 42b of the tray 42. For manual indexing, manual knob 61 is pulled to the left to pull Geneva gear 62 against spring 64 out of mesh with member 63 of the Geneva gear mechanism and the knob 61 is turned manually to index the tray 42 to the desired position and the spring 64 returns the gear 62 into mesh. A normally closed limit switch 71 in series with the switch 53 serves to stop the motor when the nut 47 reaches its extreme left-hand position unless a manually operable switch (not shown) is set in its automatic or closed position or a manually operable momentary switch (not shown) is held closed.

A known light source 81 (FIG. 5), condenser lens system 82 and projection lens 83 are provided for projecting the transparency. A motor 84 drives a cooling fan 85 and also drives the capstan 32 through means including shaft 86. The head 31 is mounted on pivotal arm 92 (FIG. 6) and is urged to the left by a spring (not shown).

In FIG. 7 there is shown a sound slide 101 which includes a slide holder 102 holding a mounted transparency 103 and an endless sound tape 104 in generally aligned but eccentric relationship. At its back side the slide holder 102 retains the mounted slide similarly to slide holder 21 with the transparency 103 aligned with rectangular aperture 102$b$ which is eccentric to the holder 102. A forwardly facing eccentric recess 102$c$ serves with a cover plate 102$d$ to form a peripheral storage chamber for the endless sound tape 104 with two large storage portions 102$d$ and 102$e$ and a small passage portion 102$f$ which is primarily to provide a passage for the tape 104. At the forward edge of the holder 102 notches 102$g$ and 102$h$ are provided for clearance for a capstan (not shown) and sound head corresponding to the capstan 32 and sound head 31 disclosed above. Backing roller 102$i$ and spring biased pressure plate 102$j$ also are provided.

While the invention is thus described, it is not wished to be limited to the precise details described, as changes may be readily made without departing from the spirit of the invention.

What is claimed is:
1. A sound-slide holder comprising:
a first portion for holding a sound tape,
and a second portion for holding a transparency,
said first portion comprising a compartment for said sound tape,
said compartment having a head-receiving recess adapted for cooperation with a magnetic play back head,
tape guiding means in said compartment to support and guide said tape in said compartment for transport through said recess,
said second portion comprising a window for supporting a film transparency mounted therein,
said first and second portions being arranged in circumjacent relation.

2. A sound-slide holder comprising:
a first portion for holding a sound tape,
and a second portion for holding a transparency,
said first portion comprising a compartment for said sound tape,
said compartment having a head-receiving recess adapted for cooperation with a magnetic play back head,
tape guiding means in said compartment to support and guide said tape in said compartment for transport through said recess,
said second portion comprising a window for supporting a film transparency mounted therein,
said first and second portions being arranged respectively in nested outer and inner concentric relation.

3. The sound-slide holder of claim 1 wherein the guiding means includes:
a pressure plate for backing up the sound tape and holding it against a sound head, and
means for holding the sound tape against a capstan.

4. The sound-slide holder of claim 1 wherein said compartment includes a removable cover for permitting access to a sound tape in said compartment.

5. The sound-slide holder of claim 1 wherein said second portion further comprises integral retaining means for holding a film transparency mount so that the film transparency will be aligned with said window.

References Cited in the file of this patent
UNITED STATES PATENTS

| 2,499,700 | Tinkham et al. | Mar. 7, 1950 |
| 2,679,394 | Lear | May 25, 1954 |
| 2,961,922 | Schwartz et al. | Nov. 29, 1960 |

FOREIGN PATENTS

| 1,045,122 | Germany | Nov. 27, 1958 |